United States Patent [19]
Kerr, III et al.

[11] Patent Number: 5,866,261
[45] Date of Patent: Feb. 2, 1999

[54] RELEASE COMPOSITION

[75] Inventors: Stuart R. Kerr, III, Rock Hill; Reeshemah Beaty, Chester, both of S.C.

[73] Assignee: Rhodia Inc., Cranbury, N.J.

[21] Appl. No.: 772,342

[22] Filed: Dec. 20, 1996

[51] Int. Cl.$^6$ ........................................... B32B 9/04
[52] U.S. Cl. ................ 428/447; 525/478; 525/476; 528/31; 522/53; 522/148; 522/31
[58] Field of Search ...................... 525/478, 476; 528/51; 522/53, 148, 31; 428/447

[56] References Cited

U.S. PATENT DOCUMENTS

| | | | |
|---|---|---|---|
| 4,082,719 | 4/1978 | Liles et al. | 525/476 |
| 4,157,357 | 6/1979 | Mine et al. | 260/825 |
| 4,652,618 | 3/1987 | Sumida et al. | 525/478 |
| 5,128,431 | 7/1992 | Riding et al. | 528/15 |
| 5,279,860 | 1/1994 | Griswold et al. | 427/386 |

*Primary Examiner*—Margaret W. Glass
*Attorney, Agent, or Firm*—Andrew M. Solomon

[57] ABSTRACT

A composition of matter comprising:
(a) about 60 to about 99 parts by weight of a curable epoxypolyorganosiloxane;
(b) about 1 to about 40 parts by weight of a crosslinkable silicone hydride resin having no epoxy functionality; and
(c) about 0.1 to about 5 parts by weight of an curing agent, which, upon exposure to actinic radiation is capable of curing components (a) and (b);

wherein the total amount of components (a) and (b) is 100 parts by weight and wherein said composition demonstrates surface release properties when coated and cured onto a substrate is provided. The composition is particularly useful in articles of manufacture where release properties are desired.

26 Claims, No Drawings

RELEASE COMPOSITION

BACKGROUND OF THE INVENTION

1. Field of the Invention

This invention relates to release surfaces useful for release liners and adhesive contacting release surfaces for self-wound tapes among other applications. More specifically, the invention combines the use of an epoxypolyorganosiloxane with a crosslinkable silicone hydride resin to yield a material which demonstrates superior release properties.

2. Technology Description

A major utility of the invention concerns an improved release liner (or backing) for use in combination with a pressure-sensitive adhesive layer and a face stock preferably for label applications. In such combinations, the release liner protects the pressure-sensitive adhesive (PSA) prior to the label being used and is removed immediately prior to application of the label to another surface.

Additionally, the release liner serves to facilitate cost effective manufacture of rolls or sheets of labels. It also functions as a carrier of labels for dispensing in automatic labeling operations and for computer printing in EDP applications. The performance attributes of a release liner are critical to both the manufacture and end-use application of pressure sensitive adhesive labels.

In conventional practice, the release liner is provided as a silicone layer on a support layer having high holdout, i.e., the support layer on which the silicone layer is deposited is resistant to silicone penetration. Where the support layer is paper, a special and, therefore, expensive paper, such as a super-calendered or densified glossy paper, is required. One currently accepted way of applying a silicone release composition to a high-holdout support layer is by solvent coating. Growing concern over the environment has imposed stringent restrictions regarding recovery of the solvent used in applying the solvent based silicone to the high-holdout backing paper or other materials.

An alternative to this is to use 100% solids silicone release compositions. These are supplied with a viscosity (usually <2000 cps) suitable for roll-coating techniques. Application of these to porous substrates such as low cost papers, machine finished (MF) or machine glazed (MG) papers, finds these materials to soak into the paper (penetrate the paper surface) to give ineffective coverage of the paper fibers unless excessively high quantities of expensive silicone are used. Ineffective coverage of the paper fibers provides unsuitable release liners for PSA applications especially where high speed convertibility is an essential performance feature.

A major application for a release liner is as part of bulk rolls of laminate consisting of the release liner, a face stock between which there is contained an inherently tacky self-adhesive, or pressure-sensitive adhesive. The adhesive may be permanent or repositionable. The rolls are converted by printing label information on the face stock, die cutting the labels through the face stock and adhesive to the surface of the release liner, followed by removal of the matrix surrounding the labels thus leaving a plurality of labels on the release liner.

It is important that the force required for release be sufficiently low for the intended application, but not so low that the die cut labels will release or predispense from a moving web turning a corner or remove with the waste matrix during its removal. The release force should also be not so high that the matrix is broken during its removal.

It is known to this art to prepare antiadhesive coating compositions for use in the above-described technical fields based on a polyorganosiloxane containing functional groups (of the epoxy or vinyl ether type, and the like) to which a polymerization initiator, such as an onium salt is added for the crosslinking thereof. Examples of patent literature which disclose such coating compositions are in contained in U.S. Pat. Nos. 4,313,988; 4,450,360; 4,576,999; and 4,640,967.

Of particular interest are antiadhesive coating compositions based upon epoxy-functional polysiloxane chemistry because of their ease of use and ability to crosslink and form an excellent release surface when exposed to ultraviolet radiation. Irradiation crosslinking technology has decisive advantages when compared with conventional thermal based systems such as very rapid cure rates, the absence of solvents, the possibility of operating at ambient temperature and therefore on heat sensitive substrates, and the use of minimal maintenance coating machines leading to reduced operating costs. In addition, these materials are capable of being used with reduced toxicity and excellent long term stability of release properties.

The use of various control release modifiers for silicone polymers are disclosed in the following patent publications: U.S. Pat. No. 5,310,601; U.S. Pat. No. 5,158,991; U.S. Pat. No. 5,468,828; U.S. Pat. No. 5,468,816; and EP 0108208. The modifiers are alleged to assist in the functional properties of the final coating compositions. Typically what has been proposed is the utilize a modifier which has a similar functionality to the silicone polymer. For example, in the field of vinyl silicone polymers, the release modifiers suggested have been so called MQ resins which have been modified to have a vinyl functionality. This is suggested in EP 0108208. In the field of epoxypolyorganosiloxane polymers, the release modifiers suggested have had an epoxy functionality. For example, U.S. Pat. Nos. 5,310,601 and 5,158,991 include modifiers which contain epoxy functional organic radicals containing between about 2 and about 20 carbon atoms. The literature fails to disclose or suggest the use of modifiers that do not have functionality correlating to the functionality of the base polymer.

Despite the above advanced associated with release coatings, and in particular those based upon epoxy-functional polysiloxane chemistry, there still exists a need in the art for products having even better release properties than previously expected. The invention at hand utilizes an additional monomer having no epoxy functionality, present in combination with the epoxy-functional siloxane to yield a resulting composition, which, when cured, yields outstanding release properties.

BRIEF SUMMARY OF THE INVENTION

In accordance with the present invention a novel composition useful in providing excellent release properties is provided. More specifically, the composition includes both an epoxy-functional siloxane and a crosslinkable silicone hydride resin which has no epoxy functionality.

In accordance with one embodiment, the present invention comprises a composition of matter comprising:

(a) about 60 to about 99 parts by weight of a curable epoxypolyorganosiloxane;
(b) about 1 to about 40 parts by weight of a crosslinkable silicone hydride resin having no epoxy functionality; and
(c) about 0.1 to about 5 parts by weight of an curing agent, which, upon exposure to actinic radiation is capable of curing components (a) and (b);

wherein the total amount of components (a) and (b) is 100 parts by weight and wherein said composition demonstrates surface release properties when coated and cured onto a substrate.

Particularly preferred embodiments include the use of polydimethylsiloxane polymers functionalized by epoxy groups, more specifically, β-(3,4-epoxycyclohexyl)ethyl groups as the curable epoxypolyorganosiloxane, the use of MQ resins which are copolymers comprising monovalent trialkyl units of the formula $R_3SiO_{1/2}$ and tetravalent $SiO_{4/2}$ units wherein the ratio of M to Q is between about 0.5:1 to about 2:1 and the use of onium salt curing agents, particularly onium borates of elements of Groups 15 to 17 of the Periodic Table which cure upon exposure to ultraviolet radiation. Also preferred is an embodiment which includes a very minor amount of an epoxy functional monomer having a high molecular weight and comparatively fewer epoxy groups as compared to component (a) which, when combined with the silicone hydride component (b) enables the production of release coatings having customized properties.

Another embodiment of the present invention comprises a process for rendering a surface abherent by coating the above composition onto a surface of a substrate and thereafter applying actinic radiation to cure said composition onto the substrate.

Yet another embodiment of the present invention comprises a substrate having a release surface wherein the release surface is obtained by coating and curing the above-defined composition onto a surface of the substrate. In commercial applications, the substrate may be used in connection with adhesive tapes, labels, diaper tabs, packaging materials, and the like.

An object of the present invention is to provide a composition having excellent controlled release properties.

Still another object of the present invention is to provide a process for rendering a surface abherent by the application and curing of a novel release composition.

A further object of the present invention is to provide a substrate having a release surface formed by a novel release composition.

These, and other objects, will readily be apparent to those skilled in the art as reference is made to the description of the preferred embodiments.

DETAILED DESCRIPTION OF THE PREFERRED EMBODIMENTS

In describing the preferred embodiments, certain terminology will be utilized for the sake of clarity. Such terminology is intended to encompass the recited embodiment, as well as all technical equivalents which operate in a similar manner for a similar purpose to achieve a similar result.

The present invention includes a multicomponent composition which, when applied to a surface on a substrate and exposed to actinic radiation, cures on the substrate to form a release surface.

The first component of the composition is a curable epoxypolyorganosiloxane. The crosslinkable polyorganosiloxanes which comprise the compositions of the invention are substituted by functional groups of the epoxy type.

Such polyorganosiloxanes are linear or substantially linear and comprise recurring structural units of formula (I) and endgroups of formula (II), or are cyclic and comprise recurring structural units of formula (I)

$$-(-Si-O-)-\quad\quad (I)$$
with R' and Y substituents

-continued

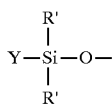
(II)

in which formulae the symbols R', which may be identical or different, are each a $C_1$–$C_6$ linear or branched alkyl radical, which is optionally substituted (3,3,3-trifluoropropyl, for example), a $C_5$–$C_8$ cycloalkyl radical, an aryl (especially phenyl) radical, a substituted aryl (dichlorophenyl, for example) radical and the like, at least 60 molar % of the radicals R' being methyl radicals; and the symbols Y which may be identical or different, are each as defined for R' or a cationically crosslinkable functional organic radical, such as the epoxyfunctional groups, said epoxide, vinyl ether and the like functional groups being bonded to an atom of the silicone chain via a divalent bridge having from 2 to 20 carbon atoms; with the proviso that at least one of the symbols Y is a crosslinkable functional organic radical, and preferably from 1 to 10 functional organic radicals per mole of polymer.

The epoxypolyorganosiloxanes are described, especially, in U.S. Pat. No. 4,046,930, DE-A-4,009,899, EP-A-396,130, EP-A-355,381, EP-A-105,341, FR-A-2,110,115 and FR-A-2,526,800. To the extent necessary for completion, these references are expressly incorporated by reference.

The epoxyfunctional polyorganosiloxanes can be prepared by a hydrosilylation reaction between oils containing Si—H structural units and epoxyfunctional compounds such as 4-vinylcyclohexene oxide, allyl glycidyl ether and the like.

Particularly preferred are epoxypolyorganosiloxanes of formula (III)

$$R_2R^2SiO(RR^1SiO)_x(R_2SiO)_y(RHSiO)_zSiR^2R_2 \quad\quad (III)$$

wherein R is individually a lower alkyl radical having from 1 to about 8 carbon atoms; $R^1$ individually is a monovalent cycloaliphatic epoxy-functional organic radical having from 2 to about 20 carbon atoms; $R^2$ is individually a lower alkyl radical having from 1 to about 8 carbon atoms or a monovalent cycloaliphatic epoxy-functional organic radical having from 2 to about 20 carbon atoms; "x" is a number ranging from about 1 to about 50; "y" is a number ranging from about 1 to about 1000; and "z" is a number ranging from about 0 to about 5.

In a particularly preferred embodiment, each R represents a methyl group, $R^1$ represents a β-(3,4-epoxycyclohexyl) ethyl group of the following formula a) 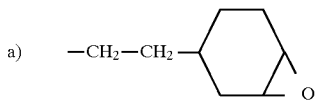

each $R^2$ represents a methyl group, x is a number between about 1 and about 10; y is a number between about 20 and about 150; and z is a number between about 0 and about 2. In even more preferred embodiments, R, $R^1$ and R2 are as defined above, x is between about 3 and about 9, y is between about 100 and 150 and z is 0.

Other structures which may advantageously be selected as the epoxy functional group include the following:

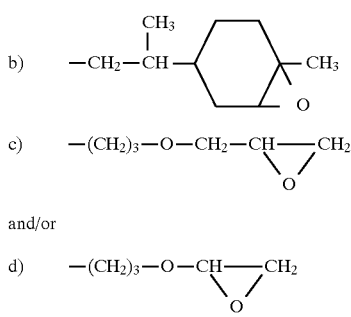

b) —CH₂—CH(CH₃)—C₆H₉(CH₃)O (cyclohexene oxide group)

c) —(CH₂)₃—O—CH₂—CH—CH₂ (with epoxide O)

and/or d) —(CH₂)₃—O—CH—CH₂ (with epoxide O)

The epoxypolyorganosiloxanes are generally provided in the form of fluids exhibiting a viscosity at 25° C. of 10 to 10,000 mm²/s and preferably from 100 to 600 mm²/s. The molecular weight of the epoxypolyorganosiloxane is between about 1000 to about 100,000 daltons, more preferably between about 1000 and about 25,000 daltons. The use of lower weight materials are preferred because of handling performance and versatility of application (i.e., 100% solids or solution coatings can be used.)

A commercial example of an epoxypolyorganosiloxane suitable for use in connection with the present invention is sold under the trade designation Silcolease® PC-600 by Rhône-Poulenc.

In practice the amount of the epoxypolyorganosiloxane comprises between about 60 to about 99 percent by weight of the coating composition prior to cure. In more preferred embodiments the amount of the epoxypolyorganosiloxane comprises between about 70 to about 95 percent by weight of the coating composition prior to cure, and in most preferred embodiments the amount of the epoxypolyorganosiloxane comprises between about 80 to about 95 percent by weight of the coating composition prior to cure.

The second component of the novel composition of the present invention comprises a crosslinkable silicone hydride resin having no epoxy functionality. Such materials are polysiloxanes having primarily monofunctional (M) units, difunctional (D) units, trifunctional units (T) or tetrafunctional (Q) units. A general discussion of these resins is found in Chapters 1 and 6 of Noll, *Chemistry and Technology of Silicones*, 2nd. ed., 1968.

The crosslinkable silicone hydride resin is of the formula:

$$M_\alpha D_\beta T_\chi Q_\delta (OR^1)_\epsilon$$

wherein:

$M = R_3SiO_{1/2}$ $D = R_2SiO_{2/2}$ $T = RSiO_{3/2}$ $Q = SiO_{4/2}$ (1) R can be identical or different and represents either:
   a linear or branched alkyl radical, having from 1 to about 8 carbon atoms;
   a substituted or unsubstituted aryl group having from 6 to 12 carbon atoms, especially a phenyl group;
   an aralkyl, alkaryl, aryloxyalkyl or alkoxyaryl group wherein the aryl moiety has 6 to 12 carbon atoms which can optionally be substituted by at least one linear or branched alkyl group on alkoxy group having 1 to 4 carbon atoms; and wherein the alkyl or alkoxy moiety is a linear or branched radical having between 1 and about 4 carbon atoms; or
   a hydrogen atom;

(2) the symbol R¹ is identical or different and represents a linear or branched alkyl group having 1 to 4 carbon atoms or an hydrogen radical;

(3) the symbols α, β, χ, and δ represent the molar fractions of the silicon atoms respectively of type M, D, T and Q for one atom of silicon;

(4) the symbol ε represents the molar fraction of SiOR¹ units per silicon atom;

(5) and α, β, χ, δ and ε being present in the following molar ratios

α=0–0.95

β=0–0.95

χ=0–0.99

δ=0–0.99

ε=0–2 with the proviso that the sum of (α, β, χ and δ must equal 1.

The crosslinkable silicone hydride resin has a molecular weight greater than about 2000 grams of equivalent polystyrene, more preferably between about 2000 to about 20,000 grams of equivalent polystyrene.

In particularly preferred embodiments of the hydride resin, R represents an alkyl group, preferably a methyl or ethyl group. In other preferred embodiments, the value of α is preferably between 0.01–0.5, more preferably between 0.01–0.10; the value of β is preferably 0; the value of χ is preferably 0; the value of δ is preferably between 0.5–0.99, more preferably between 0.9–0.99; and the value of ε is preferably between 0–1, more preferably between 0–0.5.

In yet other preferred embodiments, the crosslinkable silicone hydride resin is made up of only M and Q groups wherein the R groups for the M group comprises two methyl groups and one hydrogen atom.

In other particularly preferred embodiments of the hydride resin, there are only M and Q groups, each R is a methyl group and the ratio of M groups to Q groups is between about 0.5:1 to about 1:1, more preferably about 0.7:1 and which has at least one hydride functional group per MQ molecule.

In order to utilize crosslinkable silicone resins having optimal M to D to T to Q ratios it is often necessary that the resin be distributed in a solvent, such as xylene or toluene. For example, MQ resins which are 50 percent solutions in xylene are quite common. In practice, when making a solventless coating, the solvent is ultimately stripped from the final composition prior to coating and curing.

The amount of the crosslinkable silicone hydride resin will comprise between about 1 to about 40 percent by weight of the coating composition prior to cure. In more preferred embodiments the amount of the silicone hydride resin comprises between about 5 to about 30 percent by weight of the coating composition prior to cure, and in most preferred embodiments the amount of the silicone hydride resin comprises between about 10 to about 20 percent by weight of the coating composition prior to cure.

The next component of the composition comprises a curing agent, which, upon exposure to actinic radiation is capable of curing the above discussed epoxypolyorganosiloxane and silicone hydride resin. Preferred is the use of onium salts as curing agents.

Suitable onium borate initiators are discussed in U.S. Pat. Nos. 5,340,898 and 5,468,902. To the extent necessary for completion, these references are expressly incorporated by reference. As set forth in these patents, a particularly preferred combination includes the use of a catalytically effective amount of an onium borate of an element selected from among Groups 15 to 17 of the Periodic Table [Chem. & Eng.

News, Vol. 63, No. 5, 26; 4 Feb. 1985]; the cationic moiety of said onium borate being selected from among:
(1) the onium salts having the formula (IV):

in which A is an element from Groups 15 to 17, such as I, S, Se, P, N and the like; R' is a $C_6$–$C_{20}$ heterocyclic or carbocyclic aryl radical, said heterocyclic radical containing at least one of the heteroelements, nitrogen, sulfur, and the like; R" is R' or a linear or branched, $C_1$–$C_{30}$ alkenyl or alkyl radical, said radicals R' and R" optionally being substituted by a $C_1$–$C_{25}$ alkoxy, C1–C25 alkyl, nitro, chloro, bromo, cyano, carboxyl, mercapto group and the like; n is an integer ranging from 1 to v+1, with v being the valence of the element A; and m is an integer ranging from 0 to v−1 with n+m=v+1;
(2) oxoisothiochromanium salts of the following formula:

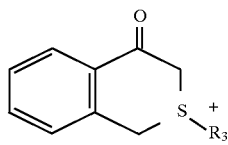

wherein R3 represents a linear or branched alkyl group containing between 1 and about 20 carbon atoms, linear or branched alkyl group containing between 1 and about 20 carbon atoms, or an aryl group;
and the anionic borate moiety having the formula:

which a and b are integers ranging from 0 to 4 with a+b=4; the symbols X are each a halogen atom (chlorine or fluorine) with a=0 to 3, or an OH functional group with a=0 to 2; and the symbols R'", which may be identical or different, are each a phenyl radical substituted by at least one electron-withdrawing group, such as $CF_3$, $NO_2$, CN and the like, or by at least two halogen atoms (most particularly fluorine), or an aryl radical containing at least two aromatic ring members, such as biphenyl, naphthyl and the like, and optionally substituted by at least one electron-withdrawing element or group, especially a halogen atom (most particularly fluorine), $CF_3$, $NO_2$, CN and the like.

Advantageously, the anionic borate species is chosen from the following anions:
[B $(C_6F_5)_4$]⁻ [B($C_6H_3$ $(CF_3)_2$)$_4$]⁻
[($C_6F_5$)$_2$ B $F_2$]⁻[B($C_6H_4$ $OCF_3$)$_4$]⁻ and [B $(C_6H_3F_2)_4$]⁻

The onium salts having the formula (IV) are described in the literature, patent and otherwise, for example in U.S. Pat. Nos. 4,026,705, 4,032,673, 4,069,056, 4,136,102 and 4,173,476.

The following cations, wherein φ is phenyl, are very particularly representative:

| | |
|---|---|
| [(Φ)$_2$ I]⁺ | [$C_8H_{17}$-O-Φ- I- Φ]⁺ |
| [$C_{12}H_{25}$-Φ- I -Φ]⁺ | [($C_8H_{17}$-O-(Φ)$_2$ I]⁺ |
| [(Φ)$_3$ S]⁺ | [(Φ)$_2$- S -Φ-O-$C_8H_{17}$]⁺ |
| [Φ-S-Φ- S -(Φ)$_2$]⁺ | [($C_{12}H_{25}$-Φ)$_2$ I]⁺ |
| [$CH_3$-Φ-I-Φ- CH($CH_3$)$_2$]⁺ | [$CH_3$-Φ-I-Φ-$CH_3$]⁺ |
| and [(Φ)$_2$S-Φ-S-Φ-S(Φ)$_2$]⁺² | |

In accordance with the invention, the initiators which will be used more particularly are the following onium borates:
[(Φ—$CH_3$)$_2$I]⁺, [B $(C_6F_5)_4$]⁻, [(Φ)$_2$I]⁺, [B $(C_6F_5)_4$]⁻,
[$C_{12}H_{25}$—Φ—I—Φ]⁺, [B $(C_6F_5)_4$]⁻, [($C_8H_{17}$—O—Φ—I—Φ]⁺, [B $(C_6F_5)_4$]⁻,
[($C_8H_{17}$—O—Φ)$_2$I]⁺, [B $(C_6F_5)_4$]⁻, [(Φ)$_2$I]⁺, [B($C_6H_3$ $(CF_3)_2$)$_4$]⁻,
[(Φ)$_2$S—Φ—O—$C_8H_{17}$]⁺, [B($C_6H_4CF_3$)$_4$]⁻, [($C_{12}H_{25}$—Φ)$_2$I]⁺, [B $(C_6F_5)_4$]⁻,
[$CH_3$—Φ—I—Φ—CH($CH_3$)$_2$]⁺[B $(C_6F_5)_4$]⁻, [(Φ)$_3$S]⁺, [B $(C_6F_5)_4$]⁻,
[$CH_3$—Φ—I—Φ—CH($CH_3$)$_2$]⁺[B($C_6H_4OCF_3$)$_4$]⁻, and 2[B($C_6F_5)_4$]⁻, [(Φ)$_2$S—Φ—S—Φ—S(Φ)$_2$]⁺²

When the cationic portion is of formula (2) it is preferably the 2-ethyl-4-oxoisothiochromanium or 2-dodecyl-4-oxoisothiochromanium salt.

The onium borates according to the present invention can be prepared by an exchange reaction between a salt of the cationic moiety, especially a halide (chloride, iodide), and an alkali metal salt (sodium, lithium or potassium) of the anionic moiety.

The operating conditions (respective amounts of reactants, choice of solvents, duration, temperature, stirring and the like) are easily determined by one skilled in this art; they must permit recovery of the desired initiator salt in the solid state, by filtration of the precipitate formed, or in the oily state, by extraction using a suitable solvent.

The alkali metal salts of the anionic moiety can be prepared in known manner, by an exchange reaction between a haloborated compound and an organometallic compound (of magnesium, lithium, tin and the like) bearing the desired hydrocarbon groups, in a stoichiometric amount, optionally followed by a hydrolysis using an aqueous solution of an alkali metal halide; this type of synthesis is, for example, described in J. of Organometallic Chemistry, Vol. 178, p. 1–4 (1979); J.A.C.S., 82, 5298 (1960); Anal. Chem. Acta, 44, 175–183 (1969); U.S. Pat. No. 4,139,681 and DE-A-2,901,367; Zh. Org. Khim., Vol. 25, No. 5-pages 1099–1102 (May 1989).

Other cationic photoinitiators can alternatively be selected for use.

The curing agent is present in an amount of about 0.1 to about 5 percent by weight of the composition with amounts of 0.2 percent to about 2.0 percent being more preferred.

The compositions according to the invention can additionally contain other additives and adjuvants, such as adherence modulators (linear silicone polymers or resins bearing vinyl, epoxy, vinyl ether, alcohol and the like functional groups), pigments, photosensitizing agents, fungicides, bactericides, stabilizers and antimicrobial agents, corrosion inhibitors and the like.

A particularly preferred additive comprises an epoxy monomer having a higher molecular weight and less epoxy functional groups than the curable epoxypolyorganosiloxane and is defined by the term for purposes of this document as a "low release control release additive". More specifically, this material generally has less than 3 percent reactive epoxy groups and a molecular weight of at least 15,000 daltons. A commercial example of such a material is sold by Rhône-Poulenc under the trade designation Silcolease ® PC-670 CRA-. This low release control release additive is added in amounts of about 0.1 to about 20.0 parts by weight of the coating formulation.

The use of the low release control release additive in combination with the silicone hydride MQ resin enables one skilled in the art to develop coatings having specifically tailored release properties. In practice the ratio of silicone hydride MQ resin to low release control release additive is generally between about 5:1 to about 25:1, with a ratio of about 10:1 being more preferred. Utilization of the combination of these two additives results in a product having properties which are both tight (i.e., excellent adherence of a pressure sensitive adhesive to the coated substrate) but smooth upon release (i.e., the removal of the adhesive from the coated substrate occurs without a ratchet or zippered effect).

The compositions according to the invention can be used as such or in solution in an organic solvent. They are useful for providing antiadherent coatings on cellulosic materials, films, paints, encapsulation of electrical and electronic components, coatings for textiles and for sheathing optical fibers.

They are very particularly advantageous when they are used, as such, to produce a material, such as metal sheets, glass, plastics or paper, that is nonadherent to other materials to which it would normally adhere. The composition advantageously exhibits a viscosity not exceeding 2,000 mpa.s.

Thus, the present invention also features a process for the production of articles (sheets for example) that are nonadherent to surfaces to which they normally adhere, comprising coating an amount of the subject composition, generally from 0.1 to 5 g per m$^2$, onto at least one face surface thereof, and crosslinking the composition by supplying actinic radiation (i.e., visible light, ultraviolet or electron beam radiation). The type of radiation source utilized is directly correlated to the curing agent selected. In preferred embodiments, when using initiators which liberate hydrogen proton cations upon exposure to ultraviolet radiation, the radiation source selected should be an ultraviolet wave source.

The preferred ultraviolet radiation used has a wavelength of from 200 to 400 nanometers, preferably from 230 to 360 nanometers.

The duration of irradiation can be short and it is generally less than 1 second and is on the order of a few hundreds of a second for very thin coatings.

The crosslinking attained is excellent even in the absence of any heating. It will of course be appreciated that heating at a temperature of from 25° C. to 100° C. is also within the scope of the invention.

It will of course be appreciated that the hardening time, especially, can be adjusted, by the number of ultraviolet lamps used, by the duration of exposure to ultraviolet and by the distance between the composition and the ultraviolet lamp.

The solvent-free compositions, (i.e., compositions which have had the solvent stripped from the hydride resin, if present) are applied with the aid of devices capable of uniformly depositing small amounts of liquids onto a surface. For example, Gravure type or multi-roll coaters may be selected. Use of any suitable coating apparatus is deemed to be within the skill of the artisan.

The amounts of composition deposited onto the substrates are variable and typically range from 0.1 to 5 g/m$^2$ of treated surface. These amounts depend on the nature of the substrates and on the desired antiadherent properties. They usually range from 0.5 to 3 g/m$^2$ for nonporous substrates.

The present invention also features the final articles (sheets for example) comprising a solid material (metal, glass, plastic, paper, foil and the like), at least one face surface of which is coated with a composition as described above, which composition is photocrosslinked or crosslinked by actinic radiation.

While a primary application of the invention is for single or double coated release liners for tapes, labels or personal care items (e.g., diapers), other applications include: embossing strip release liners, protective release surfaces for floor tiles and wall coatings, release papers for low pressure plastic laminates, release materials for interleaves, release materials for self-sealing roofing, bakery tray liners, and like applications where a release surface of some definite value exists.

While not wishing to be bound to any specific scientific theory, the inventors hypothesize that the combination of the epoxy functional monomer with the hydride functional resin provides surprisingly unexpected synergies. Conventional approaches for selecting release modifier additives have been restricted to using materials of similar functionality. For example, epoxy functional release modifier additives have been proposed for use in combination with epoxy functional monomers. In accordance with the present invention, the use of what would otherwise be thought to be a combination of incompatible materials is selected. It is theorized that the crosslinkable silicone hydride resin, upon coating and curing onto a surface of a substrate orients itself to the release surface (i.e., the surface in direct contact with the pressure sensitive adhesive to which it is mated) of the coating composition and sets. Similarly, because of the incompatibility of the materials, it is believed that since the silicone hydride resin readily orients itself to the upper surface of the coating, it is not necessary that it be present in amounts greater than 40 percent by weight of the coating composition as it is only the release surface that is needed for modification.

In accordance with the present invention, the compositions are able to provide release values on the order of between about 5 to about 500 grams per linear inch at pull rates of about 12 inches to 1200 inches per minute. In addition, the selected materials are extremely stable over time and typically demonstrate Keil-aging release of less than a 50% increase. The compositions also demonstrate a very low percentage of extractables, with amounts of less than 5.0 percent occurring.

The invention is described in greater detail by the following non-limiting examples.

COMPARATIVE EXAMPLE 1

To 100 parts of the following epoxypolyorganosiloxane

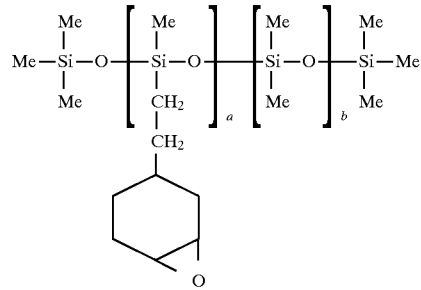

where a is about 7 and b is about 82 is added about 0.4 parts by parts by weight of the following photoinitiator in a 20 percent by weight solution in a diacetone alcohol solvent.

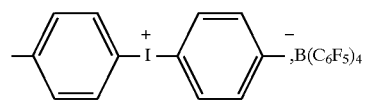

Synthesis of this photoinitiator is described in U.S. Pat. No. 5,340,898, Example 1. This mixture is agitated by hand for 30 minutes and the mixture is deposited at a coating weight of about 1.0–1.5 g/m$^2$ (0.6lb/3000 sq.ft.) onto a polyethylene terephthalate film having a thickness of about 2 mils using an offset Gravure coater.

The coated film is transported under an ultraviolet lamp, no electrodes, excitation by microwaves and a power of 120 W/cm irradiated. After passing the coated substrate under the lamp at the rate of 32 m/min, the irradiation energy is 0.025 J/cm$^2$ (measured with a Uvicure® cell from Eit-USA); the winding speed is 150 feet per minute.

The quality of the coating obtained after hardening is evaluated after having been placed in contact with the pressure sensitive adhesive tape (TESA 4970 Acrylic). The film liner is removed at a rate of 12 inches per minute. The release obtained is recorded in Table 2. The experiment is repeated with a separation rate of 600 inches per minute. To determine the Keil-aged properties of the composition, the above tests are repeated 20 hours after contact and at a storage temperature of about 70° C. under a weighted pressure of 1 lb./sq. in. The results are shown in Table 2.

EXAMPLES 2–5

The experiments of Comparative Example 1 are repeated except that the epoxypolyorganosiloxane is initially added to a silicone hydride MQ resin (50% solution in xylene), the resins are mixed, the xylene is stripped off by distillation and the photoinitiator is thereafter added. The silicone hydride resin used has a M:Q ratio of 0.7:1.0 which has at least one hydride functional group per MQ molecule. The respective blends of the different resins are shown in Table 1. Amounts listed are in parts by weight.

TABLE 1

| Example | Parts Epoxypolyorganosiloxane | Part MQ Resin |
|---|---|---|
| 2 | 93.75 | 6.25 |
| 3 | 87.50 | 12.50 |
| 4 | 75.00 | 25.00 |
| 5 | 50.00 | 50.00 |

The tests of Comparative Example 1 are repeated with the Example 2–5 compositions. The results are shown in Table 2. The release is listed in grams per inch.

TABLE 2

| Example | 12"/min Initial | 12"/min Keil-Aged | 600"/min Initial | 600"/min Keil-Aged |
|---|---|---|---|---|
| Comparative 1 | 11.6 | 34.3 | 13.8 | 36.1 |
| 2 | 47.3 | 274.1 | 27.6 | 52.3 |
| 3 | 156.4 | 330.2 | 32.4 | 54.6 |
| 4 | 347.1 | 470.1 | 49.9 | 85.8 |
| 5 | 1632.0 | 968.5 | 267.0 | 416.7 |

The data shows that as little as about 5% MQ resin addition nearly doubles the release and at about a 10% addition, the release is nearly quadrupled (600 inches/minute pull speed).

COMPARATIVE EXAMPLE 6 AND EXAMPLES 7–10

The experiments of Comparative Example 1 and Examples 2–5 are repeated with the differences being that the following respective amounts of epoxypolyorganosiloxane and MQ resin are used, and the heat aging stability is aging for 24 hours after attachment to the adhesive at 120° F. All tests are conducted with a pull strength of 12 inches per minute. The results are shown in the following Table

| Example | Parts Epoxypolyorganosiloxane | Parts MQ Resin | 12"/min Initial | 12"/min Heat Aged |
|---|---|---|---|---|
| 6 (Comp.) | 100.0 | 0.0 | 7.5 | 12.0 |
| 7 | 100.0 | 2.5 | 40.0 | 52.0 |
| 8 | 100.0 | 5.0 | 85.0 | 95.0 |
| 9 | 100.0 | 7.5 | not measured | 150.0 |
| 10 | 100.0 | 10.0 | not measured | not measured |

The above test data demonstrates the excellent release obtained when using the MQ resin as a control release additive. However, the release is still slightly ratchety. The percent of total extractables for Examples 7–9 range from about 0.83% to about 1.67%. By comparison, the percent of total extractables for Comparative Example 10 is about 0.77.

EXAMPLES 11–23 AND COMPARATIVE EXAMPLE 24

Compositions are prepared by adding to the Example 7–10 compositions different amounts of the chemical sold by Rhône-Poulenc under the trade designation Silcolease® PC-670 CRA- are added. The resulting compositions are shown in the attached Table. Comparative Example 24 comprises the addition of 4 parts by weight Silcolease® PC-670 CRA- to the Comparative Example 10 composition.

| Example Number | Starting Composition | Parts PC670 CRA- |
|---|---|---|
| 11 | Example 10 | 0.1 |
| 12 | Example 10 | 0.2 |
| 13 | Example 10 | 0.5 |
| 14 | Example 10 | 1.0 |
| 15 | Example 9 | 0.2 |
| 16 | Example 9 | 0.5 |
| 17 | Example 9 | 1.0 |
| 18 | Example 8 | 0.2 |
| 19 | Example 8 | 0.5 |
| 20 | Example 8 | 1.0 |
| 21 | Example 7 | 0.2 |
| 22 | Example 7 | 0.5 |
| 23 | Example 7 | 1.0 |

The experimental testing of Comparative Exmple 1 and Examples 2–5 is repeated.

| Example | 12"/min Initial | 12"/min Keil-Aged | 600"/min Initial | 600"/min Keil-Aged |
|---|---|---|---|---|
| 7 | 218.2 | 59.5 | 382.2 | 77.3 |
| 8 | 357.9 | 76.3 | 585.9 | 105.6 |
| 9 | 306.4 | 82.9 | 642.3 | 119.2 |
| 10 | 431.0 | 124.1 | 705.9 | 142.6 |
| 11 | 335.1 | 108.6 | 658.6 | 134.9 |
| 12 | 284.3 | 100.8 | 596.2 | 129.8 |
| 13 | 142.3 | 80.2 | 526.1 | 120.5 |
| 14 | 64.8 | 71.1 | 153.3 | 104.1 |
| 15 | 214.2 | 80.7 | 461.9 | 109.7 |
| 16 | 64.4 | 62.4 | 227.0 | 100.5 |
| 17 | 39.3 | 50.1 | 114.7 | 96.1 |
| 18 | 141.5 | 70.9 | 333.0 | 85.9 |
| 19 | 59.0 | 56.0 | 109.6 | 75.0 |
| 20 | 38.9 | 50.1 | 76.5 | 67.0 |
| 21 | 95.3 | 54.2 | 197.0 | 69.3 |
| 22 | 42.4 | 46.4 | 89.0 | 67.9 |
| 23 | 34.0 | 40.7 | 50.8 | 48.8 |
| Comparative24 | 16.9 | 40.1 | 35.5 | 53.9 |

In addition to the excellent quantitative results by the addition of minimal amounts of the Silcolease® PC-670-

CRA-composition, the materials demonstrate a smooth release which is not characterized by a ratchety effect.

The testing of these inventive compositions, particularly those including both the MQ resin and the Silcolease® PC-670 CRA-resin on multiple different substrates such as polyethylene terephthalate (SKYROL PET films, two types), PEK papers (polyethylene coated Kraft papers) and with both crosslinked and non-crosslinked adhesives demonstrates that they have excellent versatility and release properties.

Having described the invention in detail and by reference to the preferred embodiments thereof, it will be apparent that modifications and variations are possible without departing from the scope of the appended claims.

What is claimed is:

1. A composition of matter comprising:
   (a) about 60 to about 99 parts by weight of a curable epoxypolyorganosiloxane;
   (b) about 1 to about 40 parts by weight of a crosslinkable silicone hydride resin having no epoxy functionality; and
   (c) about 0.1 to about 5 parts by weight of an curing agent, which is activated by exposure to actinic radiation and is capable of curing components (a) and (b);
wherein the total amount of components (a) and (b) is 100 parts by weight and wherein said composition demonstrates surface release properties when coated and cured onto a substrate.

2. The composition according to claim 1 wherein said curable epoxypolyorganosiloxane comprises a linear or a substantially linear polymer of recurring structural units of formula (I) and endgroups of formula (II), or are cyclic and comprise recurring structural units of formula (I)

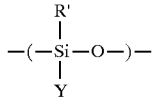

(I)

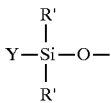

(II)

in which formulae the symbols R', which are identical or different, are each a $C_1$–$C_6$ linear or branched alkyl radical, a $C_5$–$C_8$ cycloalkyl radical, an aryl radical, or a substituted aryl radical, at least 60 molar % of the radicals R' being methyl radicals; and the symbols Y which may be identical or different, are each a group as defined by R' or a cationically crosslinkable functional organic radical being bonded to an atom of the silicone chain via a divalent bridge having from 2 to 20 carbon atoms; with the proviso that at least one of the symbols Y is a crosslinkable functional epoxy containing organic radical.

3. The composition according to claim 1 wherein said curable epoxypolyorganosiloxane is of the formula:

$$R_2R^2SiO(RR^1SiO)_x(R_2SiO)_y(RHSiO)_zSiR^2R_2$$

wherein R is individually a lower alkyl radical having from 1 to about 8 carbon atoms; $R^1$ individually is a monovalent cycloaliphatic epoxy-functional organic radical having from 2 to about 20 carbon atoms; $R^2$ is individually a lower alkyl radical having from 1 to about 8 carbon atoms or a monovalent cycloaliphatic epoxy-functional organic radical having from 2 to about 20 carbon atoms; x is a number ranging from about 1 to about 50; y is a number ranging from about 1 to about 1000; and z is a number ranging from about 0 to about 5.

4. The composition according to claim 3 wherein each R represents a methyl group, $R^1$ represents a β-(3,4-epoxycyclohexyl)ethyl group, each $R^2$ represents a methyl group, x is a number between about 1 and about 10; y is a number between about 20 and about 150; and z is a number between about 0 and about 2.

5. The composition according to claim 4 wherein x is between about 3 and 9, y is between about 100 and 150 and z is 0.

6. The composition according to claim 1 wherein said crosslinkable silicone hydride resin is of the formula:

$$M_\alpha D_\beta T_\chi Q_\delta (OR^i)_\epsilon$$

wherein:

$M=R^{ii}_3SiO_{1/2}$ $D=R^{ii}_2 SiO_{2/2}$ $T=R^{ii}SiO_{3/2}$ $Q=SiO_{4/2}$ (1) $R^{ii}$ is identical or different and represents either:
   a linear or branched alkyl radical, having from 1 to about 8 carbon atoms;
   a substituted or unsubstituted aryl group having from 6 to 12 carbon atoms;
   an aralkyl, alkaryl, aryloxyalkyl or alkoxyaryl group wherein the aryl moiety has 6 to 12 carbon atoms which can optionally be substituted by at least one linear or branched alkyl group or alkoxy group having 1 to 4 carbon atoms; and wherein the alkyl or alkoxy moiety is a linear or branched radical having between 1 and about 4 carbon atoms; or
   a hydrogen atom;

(2) the symbol $R^i$ is identical or different and represents a linear or branched alkyl group having 1 to 4 carbon atoms or a hydrogen atom;

(3) the symbols α, β, χ, and δ represent the molar fractions of the silicon atoms respectively of type M, D, T and Q for one atom of silicon;

(4) the symbol ε represents the molar fraction of $SiOR^i$ units per silicon atom;

(5) and α, β, χ, δ and E being present in the following molar ratios:

α=0–0.95

β=0–0.95

χ=0–0.99

δ=0–0.99

ε=0–2 with the proviso that the sum of α, β, χ and δ must equal 1 and wherein either χ or δ or both χ and δ are greater than zero.

7. The composition according to claim 6 wherein each $R^{ii}$ represents an alkyl group.

8. The composition according to claim 6 wherein α=0.01–0.50, β=0, χ=0, δ=0.50–0.99, and ε=0–1.

9. The composition according to claim 8 wherein α=0.01–0.10, ε=0.90–0.99, and ε=0–0.5.

10. The composition according to claim 6 wherein each $R^{ii}$ represents a methyl group.

11. The composition according to claim 6 wherein said crosslinkable silicone hydride resin has a molecular weight equal to or greater than 2000 grams of equivalent polystyrene.

12. The composition according to claim 11 wherein said crosslinkable silicone hydride resin has a molecular weight between about 2000 and about 20,000 grams of equivalent polystyrene.

13. The composition according to claim 7 wherein in the M unit $R^{ii}$ represents two methyl groups and one hydrogen atom.

14. The composition accroding to claim 6 wherein $R^{ii}$ represents at least one ethyl group.

15. The composition according to claim 1 wherein said curing agent comprises an onium salt.

16. The composition according to claim 15 wherein said onium salt comprises a catalytically effective amount of an onium borate of an element selected from among Groups 15 to 17 of the Periodic Table; the cationic moiety of said onium borate being selected from the group consisting of:

(1) onium salts having the formula (IV):

in which formula (IV) A is an element selected from the group consisting of I, S, Se, P and N; R' is a $C_6$–$C_{20}$ heterocyclic radical containing at least one heteroelements heterocyclic or a carbocyclic aryl radical; R' is a $C_6$–$C_{20}$ radical containing at least one heteroelement or a carbocyclic aryl radical or a linear or branched $C_1$–$C_{30}$ alkenyl or alkyl radical, said radicals R' and R" optionally being substituted by a $C_1$–$C_{25}$ alkoxy, C1–C25 alkyl, nitro, chloro, bromo, cyano, carboxyl or mercapto group; n is an integer ranging from 1 to v+1, with v being the valence of the element A; and m is an integer ranging from 0 to v−1 with n+m=v+1; and (2) oxoisothiochromanium salts of the following formula:

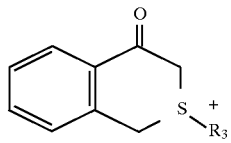

wherein in the oxoisothiocromamium salt formula $R_3$ represents a linear or branched alkyl group containing between 1 and about 20 carbon atoms or an aryl group; and wherein the anionic borate moiety is of the formula:

which a and b are integers ranging from 0 to 4 with a+b=4; X each represents a halogen atom when a=0 to 3, or an OH functional group when a=0 to 2; and each $R^v$ is a phenyl radical substituted by at least one electron-withdrawing group or by at least two halogen atoms, or an aryl radical containing at least two aromatic ring members which are optionally substituted by at least one electron-withdrawing element or group.

17. The composition according to claim 16 wherein said onium salt is selected from the group consisting of [(Φ—CH$_3$)$_2$I]$^+$[B(C$_6$F$_5$)$_4$]$^-$; [(Φ)$_2$I]$^+$[B(C$_6$F$_5$)$_4$]$^-$; [C$_{12}$H$_{25}$—Φ—I—Φ]$^+$[B(C$_6$F$_5$)$_4$]$^-$; [(C$_8$H$_{17}$—O—Φ—I—Φ]$^+$[B(C$_6$F$_5$)$_4$]$^-$; [(C$_8$H$_{17}$—O—Φ)$_2$I]$^+$[B(C$_6$F$_5$)$_4$]$^-$; [(Φ)$_2$I]$^+$[B(C$_6$H$_3$(CF$_3$)$_2$)$_4$]$^-$; [(Φ)$_2$S—Φ—O—C$_8$H$_{17}$]$^+$[B(C$_6$H$_4$CF$_3$)$_4$]$^-$; [(C$_{12}$H$_{25}$—Φ)$_2$I]$^+$[B(C$_6$F$_5$)$_4$]$^-$; [CH$_3$—Φ—I—Φ—CH(CH$_3$)$_2$]$^+$[B(C$_6$F$_5$)$_4$]$^-$; [(Φ)$_3$S]$^+$[B(C$_6$F$_5$)$_4$]$^-$; [CH$_3$—Φ—I—Φ—CH(CH$_3$)$_2$]$^+$[B(C$_6$H$_4$OCF$_3$)$_4$]$^-$; and 2[B(C$_6$F$_5$)$_4$]$^-$[(Φ)$_2$S—Φ—S—Φ—S(Φ)$_2$]$^{+2}$ wherein φ represents a phenyl group.

18. The composition according to claim 1 further comprising an additive selected from the group consisting of adherence modulators, pigments, photosensitizing agents, fungicides, bactericides, stabilizers, antimicrobial agents, corrosion inhibitors and mixtures thereof.

19. The composition according to claim 1 further comprising an additive comprising an epoxy monomer having a higher molecular weight and less epoxy functional groups than the component (a) curable epoxypolyorganosiloxane and wherein said additive is present in an amount of between about 0.1 and about 20.0 percent by weight of said composition.

20. The composition according to claim 19 wherein said additive has less than about 3 percent by weight of said additive of reactive epoxy groups and a molecular weight of at least about 15,000 daltons.

21. The composition according to claim 1 wherein component (a) comprises between about 70 and about 95 percent by weight of the composition; component (b) comprises between about 5 and about 30 percent by weight of the composition; and component (c) comprises between about 0.2 and about 2.0 percent by weight of the composition.

22. A process for rendering a surface abherent comprising the steps of:

(1) coating onto a surface of a substrate a composition of matter comprising:
 (a) about 60 to about 99 parts by weight of a curable epoxypolyorganosiloxane;
 (b) about 1 to about 40 parts by weight of a crosslinkable silicone hydride resin having no epoxy functionality; and
 (c) about 0.1 to about 5 parts by weight of an curing agent, which is activated by exposure to actinic radiation and is capable of curing components (a) and (b);
 wherein the total amount of components (a) and (b) is 100 parts by weight; and (2) exposing said surface to actinic radiation for a time period necessary to effectuate curing of components (a) and (b) onto said surface.

23. The process according to claim 22 wherein said actinic radiation comprises ultraviolet radiation.

24. An article of manufacture comprising a substrate having one or more release surfaces, said one or more release surfaces being formed by:

(1) coating onto said one or more surfaces of said substrate a composition of matter comprising:
 (a) about 60 to about 99 parts by weight of a curable epoxypolyorganosiloxane;
 (b) about 1 to about 40 parts by weight of a crosslinkable silicone hydride resin having no epoxy functionality; and
 (c) about 0.1 to about 5 parts by weight of an curing agent, which is activated by exposure to actinic radiation and is capable of curing components (a) and (b);
 wherein the total amount of components (a) and (b) is 100 parts by weight; and (2) exposing said surface to actinic radiation for a time period necessary to effectuate curing of components (a) and (b) onto said surface.

25. The article according to claim 24 wherein said article is selected from the group consisting of single or double coated release liners for tapes, labels or personal care items, embossing strip release liners, protective release surfaces for floor tiles and wall coatings, release papers for low pressure plastic laminates, release materials for interleaves, release materials for self-sealing roofing and bakery tray liners.

26. The article according to claim 25 wherein said composition further comprises an epoxy monomer having a higher molecular weight and less epoxy functional groups than the component (a) curable epoxypolyorganosiloxane and wherein said additive is present in an amount of between about 0.1 and about 20.0 percent by weight of said composition.

* * * * *